S. P. RANDOLPH.
Gang Edger.

No. 201,198. Patented March 12, 1878.

Attest.
Walter Knight
L. W. Bond

Inventor
Simon P. Randolph
By Knight Bros. Attys.

UNITED STATES PATENT OFFICE.

SIMON P. RANDOLPH, OF SEATTLE, WASHINGTON TERRITORY, ASSIGNOR TO LANE & BODLEY COMPANY, OF CINCINNATI, OHIO.

IMPROVEMENT IN GANG-EDGERS.

Specification forming part of Letters Patent No. 201,198, dated March 12, 1878; application filed November 8, 1877.

*To all whom it may concern:*

Be it known that I, SIMON P. RANDOLPH, of Seattle, King county, Washington Territory, have invented a new and useful Improvement in Sawing-Machines, of which the following is a specification:

My invention is designed for an improved guide and shifting apparatus ("shipper") for those sawing-machines known as "gang-edgers," in which a series of circular saws are employed for ripping one or more boards or planks into others of less width, or into scantlings; and my invention consists in a device whereby one or more such saws may be "shipped" (shifted longitudinally of the arbor) by means of guides which embrace each saw-blade on opposite sides near its periphery, such blade having no connection with its shaft or arbor other than that which is necessary for maintaining the concentricity and co-rotation of these members; or, in other words, the connection is such as, while holding the saw strictly to its proper axis of rotation, to permit its central portion to be self-adjustive, so as to simply follow the lead of the cutting-edge.

Figure 1:
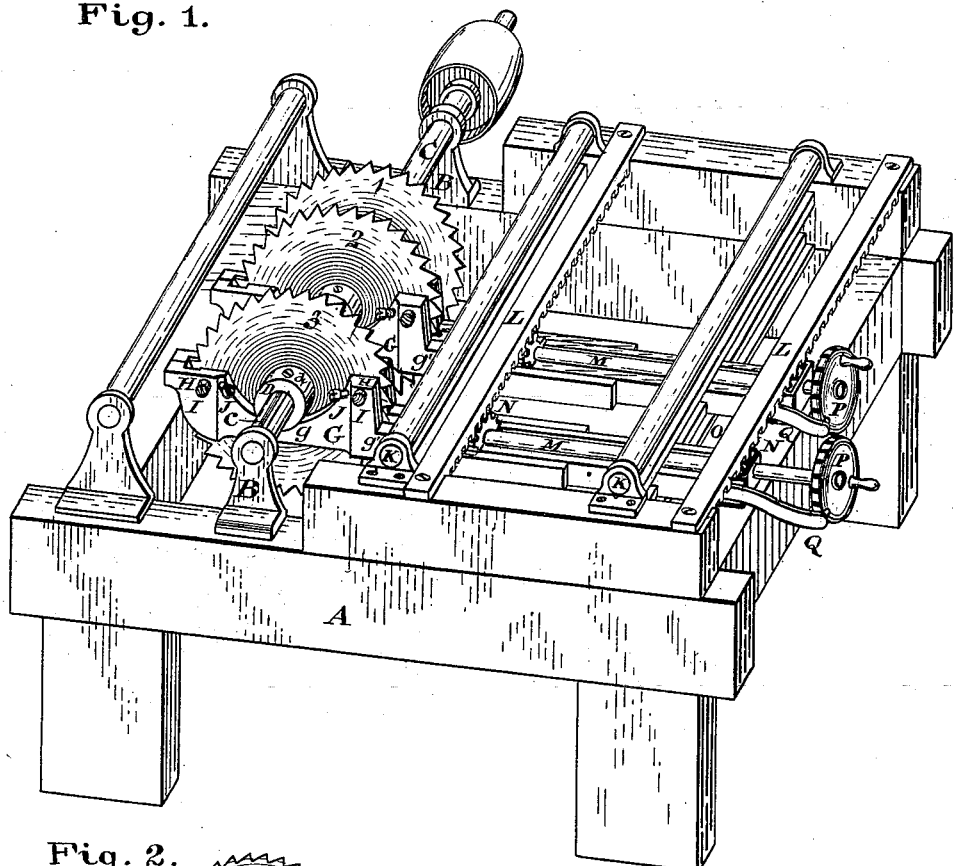
Figure 2:
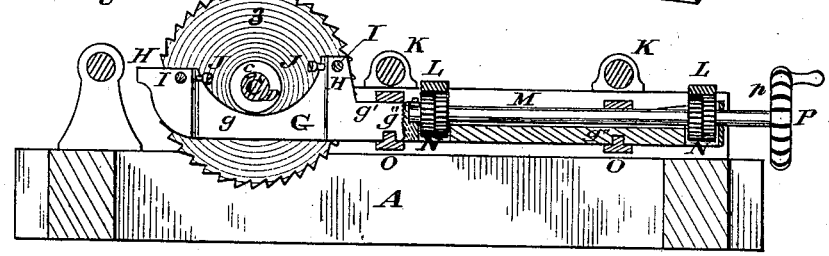
Figure 3:
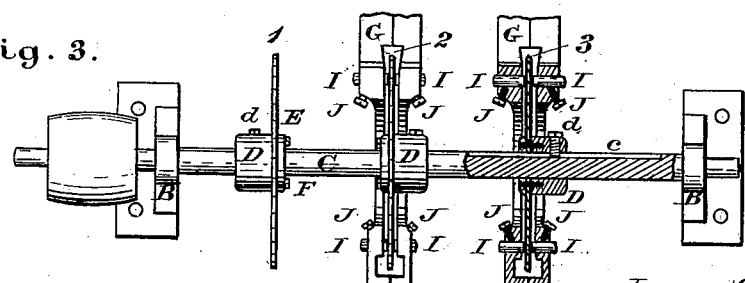

In the accompanying drawings, Figure 1 is a perspective view of a sawing-machine embodying my invention. Fig. 2 is a vertical section at right angles to the arbor. Fig. 3 is a partially-sectioned top view of the arbor and its immediate connections.

A represents a suitable frame; and B, journals supporting an arbor, C, grooved longitudinally, as shown at $c$, to receive tongues $d$, extending inwardly from the collars D of a series of circular saws, Nos. 1, 2, 3. Said collars are fastened permanently to their respective saws by means of washers E and screws F; but each saw, except the end one, (No. 1,) is capable of free longitudinal movement along the arbor, its position thereupon depending wholly on that, for the time being, assumed by the cutting-edge. The several saws are adjusted and held (as to their cutting-edges) any prescribed distance apart by means of a slotted yoke, G, whose jaws H contain wooden studs I, secured by set-screws J. The studs I are located at or about two diametrically remote points on the blade, at or near the level of the arbor, and a little within the cutting-edge. That portion of the yoke G which is in front of the saw is flush with the tops of the feed-rollers, so as to assist the latter in supporting the stuff firmly and at the proper height on each side of the saw, and as near as possible to where the cutting action takes place. Those portions of each yoke between the jaws H are coved downward, as shown at $g$, to afford room for the arbor and collar, and the portions in front of the saws are stepped downward, as at $g'$, to afford room for a series of customary feed-rollers, K, and for two racks, L, permanently attached to the frame. Each yoke portion $g'$ is prolonged forward to afford a journal-bearing for the shaft M of a pair of pinions, N, which mesh in the racks L. Each yoke is notched on its under side, as at $g''$, where it straddles, and is supported and guided by two rails, O, which are fixed in the frame parallel to the arbor.

Each pinion-shaft M extends through and in front of the frame, and terminates in a hand-wheel, P, which, being notched, as shown at $p$, at equal distances around its periphery, receives spring-catches Q, that serve to hold the said wheels and their respective connections to their precise adjustments. The notches $p$, by representing, in their distances from one another, shifts of their respective saw-blades of an eighth or other fraction of an inch, enable the attendant to set the several saws to any desired width of cut. The pinions N are preferably of the stepped form to avoid slack motion.

Each saw-blade being free to slide along the arbor, and being shifted and held wholly by its peripheral guides, the blade follows easily, and with the least possible consumption of power, in the wake of the cutting-edge.

The above-described preferred form of my invention may be varied in non-essential particulars. For example, the duplication of guide-jaws in rear of the arbor may, in some cases, be dispensed with, and special notched collars may be used for co-action with the spring-catches Q.

A circular saw capable of adjustment lengthwise of its arbor by a device attached to the central portion of the saw is objectionable in practice, because, unless the saw be perfectly in plane, it will bind and heat in the timber, for the reason that it is the entering edge that determines the place of the saw in the timber, and the center, being immovable, cannot accommodate itself to the pressure of the kerf-wall—an evil which reappears in aggravated form at each succeeding heat.

I am aware that two circular saws have been arranged upon one arbor, in which one saw has been capable of adjustment lengthwise of the arbor, and held to such adjustment while at work. I therefore do not claim, broadly, a circular saw capable of adjustment along the arbor; nor do I claim such specific arrangement as last above cited, in which the center of the saw is incapable of self-adjustment upon its arbor.

The rear pair of guides may be omitted in some cases.

I claim herein as new and of my invention—

1. In combination with a circular saw which is free to slide along its arbor, the guide-yoke G, which embraces the saw and confines the same near its rear and front edges, substantially as set forth.

2. In combination with a circular saw which is free to slide along its arbor, the guide-yokes G, so formed and arranged, as described, as to grasp the blade near its front and rear edges by studs I I, and to support the lumber both in front and rear of the saw, said guides being disconnected from the saw-center, and capable of adjustment, by the means and in the manner substantially as set forth.

3. The combination, with a series of circular saws, of which one or more are capable of sliding freely along their arbor, of the guide and shipping yokes G, which embrace the saw-blades near their edges, and the adjusting mechanism, consisting of pinions N and racks L, so as to be capable of being locked to any specific adjustment by means of the spring-catches Q and notched hand-wheels P.

4. In combination with a circular saw which has free play along its arbor, an adjustable guide-yoke, G, which is disconnected from the saw-center, and which grasps the blade, near its front or cutting edge, by means of studs I I, substantially in the manner set forth.

In testimony of which invention I hereunto set my hand.

SIMON P. RANDOLPH.

Witnesses:
 GEO. H. KNIGHT,
 WALTER KNIGHT.